DATA TRANSLATING SYSTEM

Filed June 6, 1955 5 Sheets-Sheet 1

INVENTORS
JOHN C. GROCE
WILLIAM T. RUSCH
BY Ernest Fanwick
ATTORNEY

March 14, 1961 J. C. GROCE ET AL 2,975,410

DATA TRANSLATING SYSTEM

Filed June 6, 1955 5 Sheets-Sheet 2

INVENTORS
JOHN C. GROCE
WILLIAM T. RUSCH
BY Ernest Fanwick
ATTORNEY

| CONDUCTING DIODE | SWITCHING POSITIONS 42 | 41 | 40 |
|---|---|---|---|
| 21e' | 1 | 1 | 0 |
| 21d' | 1 | 0 | 1 |
| 21c' | 1 | 0 | 0 |
| 21b' | 0 | 1 | 1 |
| 21a' | 0 | 1 | 0 |

INVENTORS
JOHN C. GROCE
WILLIAM T. RUSCH
BY Ernest Fanwick
ATTORNEY

INVENTORS
JOHN C. GROCE
WILLIAM T. RUSCH
BY Ernest Fanwick
ATTORNEY

March 14, 1961 J. C. GROCE ET AL 2,975,410

DATA TRANSLATING SYSTEM

Filed June 6, 1955 5 Sheets-Sheet 5

INVENTORS
JOHN C. GROCE
WILLIAM T. RUSCH
BY Ernest Fanusick
ATTORNEY

United States Patent Office 2,975,410

Patented Mar. 14, 1961

2,975,410

DATA TRANSLATING SYSTEM

John C. Groce, Nutley, N.J., and William T. Rusch, Kingsville, Md., assignors to International Telephone and Telegraph Corporation, Nutley, N.J., a corporation of Maryland Filed June 6, 1955, Ser. No. 513,259

11 Claims. (Cl. 340—347)

This invention relates to data translating systems and, more particularly, to an encoding system for translating the elements of a multi-digit number into a sequential code group.

Heretofore, various means have been developed for the encoding of numerical data into a form suitable for recording. The prior art devices have, in general, been unsatisfactory because the coded information was not adapted for rapid recording in a very narrow bandwidth. In order to increase the speed of encoding, it is necessary to eliminate all mechanical sequential switching and substitute therefor electronic switching. However, when electronic switching is substituted for mechanical switching, there is a tremendous increase in size, weight and volume of the resulting system which makes it unsuitable for mobile operation.

One of the objects of this invention, therefore, is to overcome the above mentioned limitations in the prior art encoding systems.

Another object of this invention is to provide means to translate a multi-digit number to a sequential code which is capable of extremely rapid operation.

A further object of this invention is to provide a data translating system whose time sequential output is in a form suitable for recording in a narrow bandwidth.

One of the features of this invention is a translator having a plurality of code signal sources each associated with a unit position of a numbering element. Cascading the numbering elements provides means for indicating a multi-digit number and switching means are utilized to couple in sequence each numbering element to an appropriate code signal source responsive to its position.

The above-mentioned and other features and objects of this invention will become more apparent by reference to the following description taken in conjunction with the accompanying drawings, in which.

Figure 1:
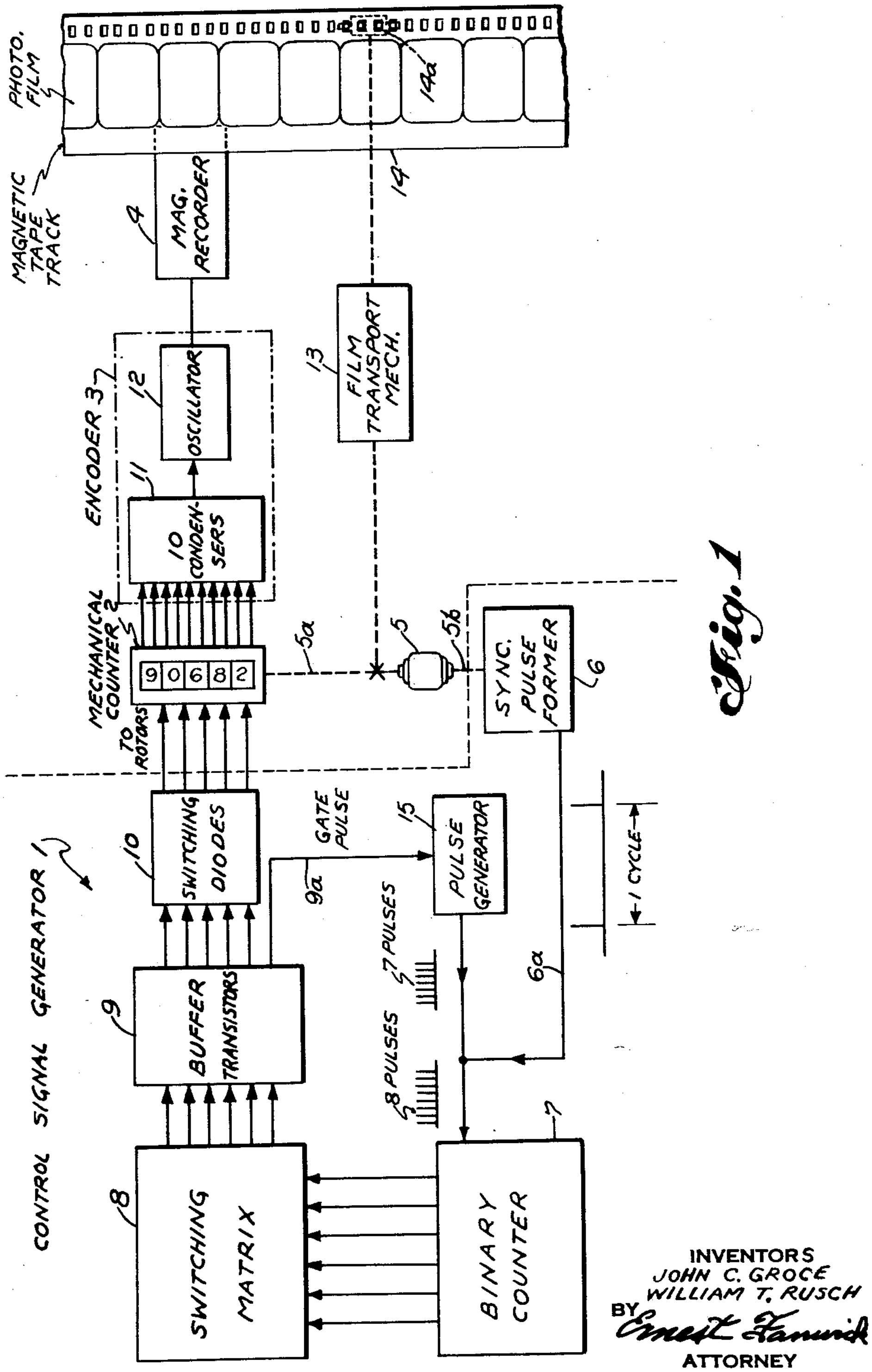
Fig. 1 is a schematic diagram in block form of one embodiment of an encoding system in accordance with the principles of our invention for providing a sequential code group indicative of the decimal number displayed by a mechanical counter.

Referring to Fig. 1 of the drawing, one embodiment of a data translating or encoding system in accordance with the principles of our invention is shown to comprise a control signal generator 1 whose output is coupled to a numbering or digital coding device 2 which may be a mechanical counter which is responsive to driving means 5 whose output is coupled to encoder 3 and the output of encoder 3 is coupled to a recorder 4. It will be readily appreciated that if the driving means 5 is caused to rotate at one cycle per second, or at any other regular rate, then by counting the number of cycles the elapsed time will be converted to a multi-digit number by counter 2 and the time can be encoded and recorded. For purposes of explanation, let it be assumed that the digital coder device or mechanical counter 2 is driven by a shaft 5*a* which is coupled to the output of the motor or driving means 5 and thus the mechanical counter 2 records the number of cycles or revolutions of the shaft 5*a* and if the motor 5 is chronometrically goverened the mechanical counter 2 would effectively record elapsed time. The control signal generator 1 causes each of the decades or numbering elements 2*a*, 2*b*, 2*c*, 2*d* and 2*e* of the mechanical counter 2 to be scanned once each cycle and, dependent upon the position of each of the numbering elements, one of a plurality of frequencies is generated by encoder 3 whose output consists of five tone signals each representing a position of one of the elements of mechanical counter 2. These five tones are selected from a group of ten signals, one associated with each position of the numbering elements. A sixth or rest frequency indicative of the period between scans of the mechanical counter 2 is also included so that the output of the encoder 3 actually comprises six code signals occurring in serial form so that when viewed as a function of time, the six frequencies follow each other. The first five frequencies in the output of the encoder 3 each represent one of the digits in one decade of the mechanical counter 2 and the sixth frequency is utilized to provide a frame of reference in the ensuing recording so that a subsequent decoding operation may be synchonized.

Figure 3:
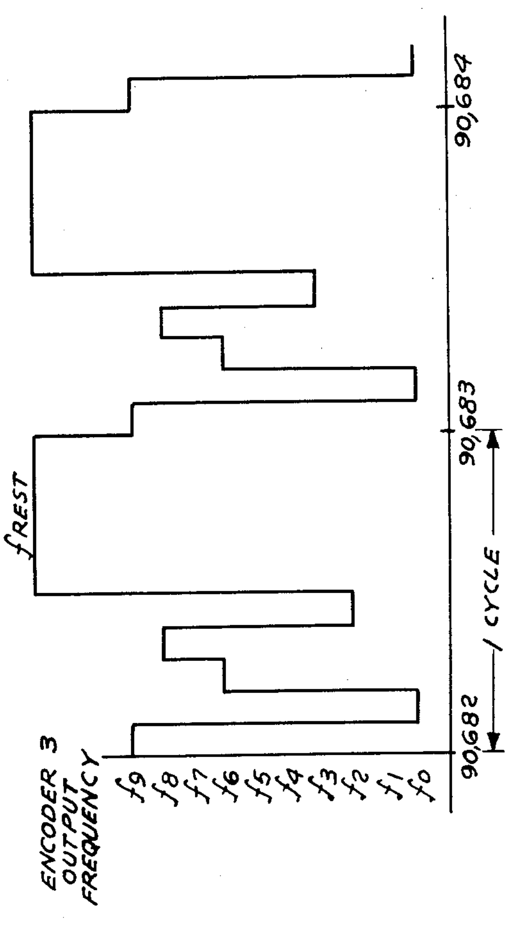
Fig. 3 is a graphic illustration of the encoder output frequency versus the elapsed time of the system shown in Fig. 1.

Referring to Fig. 3 of the drawing, a graphic representation of the output frequency of encoder 3 versus elapsed time is shown for the digital number 90,682 followed by the digital number 90,683. During the encoding cycle, the first numbering element or decade of the counter is at position 9 and frequency $f_9$ is generated. Since the second element or decade is at the 0 position, frequency $f_0$ follows frequency $f_9$ and this in turn is followed by frequencies $f_6$, $f_8$ and $f_2$ completing the number 90,682 at which time the $f_{rest}$ or carrier frequency is generated until the encoding cycle is again commenced. During the next encoding cycle, frequencies $f_9$, $f_0$, $f_6$, $f_8$ and $f_3$ are generated in sequence indicative of the next number displayed on the mechanical counter 90,683. The eleven frequencies $f_0$–$f_{rest}$ are designed to fall in the audible frequency range of 1,300 to 4,640 cycles per second. Due to the small frequency range covered between $f_0$ and $f_{rest}$, this frequency group can be passed through an appropriate amplifier to a relatively narrow bandwidth recording system, such as a magnetic tape recorder, which may be used for storing the encoded information concomitantly with various other data.

Referring again to Fig. 1, the data translating system in accordance with our invention may be best understood by noting that the scanning, reading or encoding operation is initiated by the output of a synchronous pulse former 6 which is driven from the shaft 5*b* of the motor 5. In essence, the synchronous pulse former 6 generates a trigger pulse for each cycle of the driving means, for example, for each revolution of the motor 5. The synchronous pulse former 6 is coupled over line 6*a* to trigger a three stage binary counter 7. One of the two outputs is taken from each stage of the binary counter 7 and coupled to the columns of a modified binary-octal converter matrix or, in other words, switching matrix 8. Although there are eight combinations possible in the output of the switching matrix 8, only six output rows are connected to a series of buffer or isolating transistors 9, five outputs of which in turn actuate the switching diodes 10. The outputs of the switching diodes 10 make the appropriate connections to cause the five decades 2*a*–2*e* of the mechanical counter 2 to be connected in the correct sequence to appropriate condenser values in the condenser bank 11 to adjust the output frequency of the oscillator 12. The output of oscillator 12 is coupled to a magnetic tape recorder 4 to record in sequential form the digital number displayed by the mechanical counter 2. The magnetic tape may comprise one portion of a combined tape-movie film record 14 and, obviously, if the output of the driving means 5 is utilized to actuate the film transfer mechanism 13 which drives the sprocket wheel drive 14*a*, magnetic tape encoding is time correlated with each frame of the movie film enabling the film to have recorded on the adjoining magnetic tape either a frame number or, if motor 5 rotates at a given rate, the time at which the particular frame was exposed.

The sixth output from the buffer transistor bank 9 coupled over line 9*a* is utilized as a gate signal to shut off a free running pulse generator 15. The pulse generator 15 is used to supply a train of pulses to the binary counter 7. If the speed of the motor 5 is synchronized at one revolution per second, the entire coding system would have a cyclic frequency of one coding cycle per second. The control signal generator 1 is capable of great speeds and the speed of the coding cycle is not dependent upon any mechanical operation in the control signal generator.

Figure 2:
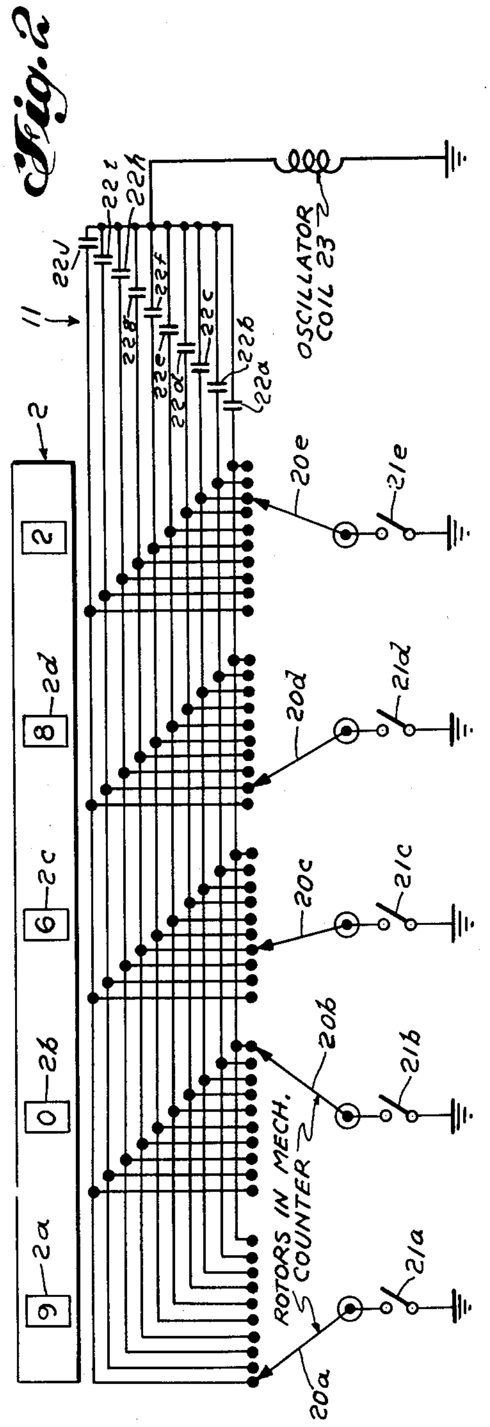
Fig. 2 is a simplified schematic diagram of the frequency switching portion of the encoder system shown in Fig. 1.

Referring to Fig. 2 of the drawing, a simplified circuit diagram of the frequency switching system for use in the coding system shown in Fig. 1 is illustrated. The digital coding device 2 is assumed to be positioned so that the decades 2*a*–2*e* represent the digital number 90,682. In the schematic drawing, each of these five decades of the mechanical counter, 2*a*–2*e*, are schematically represented by the armatures or rotors 20*a*, 20*b*, 20*c*, 20*d* and 20*e*. The switching of diodes 10 are represented, merely for purposes of explanation, as ideal switches 21*a*, 21*b*, 21*c*, 21*d* and 21*e*. During one encoding cycle each of the diode switches 21*a*–21*e* must be operated in sequence. The ten position switches to which the rotors 20*a*–20*e* are coupled may be an integral part of the decades 2*a*–2*e* of the mechanical counter 2 and the position or terminal to which the rotors 20*a*–20*e* is coupled is dependent upon the particular position of each of the numbering elements. One of ten unique capacitors 22*a*–22*j* is shunted across the oscillator tank coil 23 in the oscillator 12 each time one of the diode switches 21*a*–21*e* is closed thus generating a unique frequency responsive to the position of each of the decades 2*a*–2*e* in the mechanical counter 2.

Figures 4, 4A:
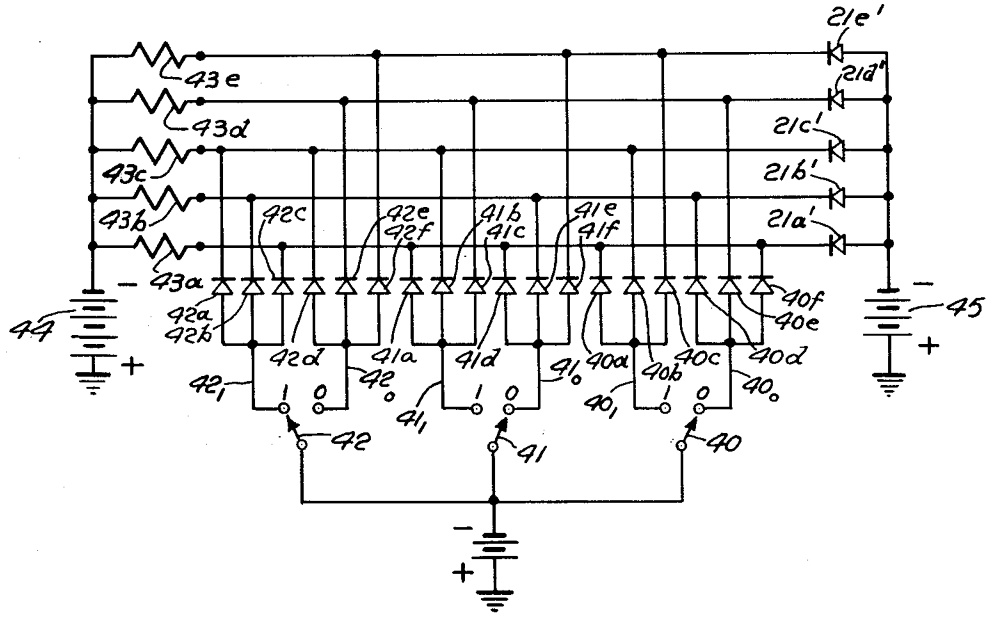
Fig. 4 is a simplified schematic diagram of one form of switching matrix for use with the encoding system shown in Fig. 1.
Fig. 4A is a simplified chart of the switch positions versus conducting diode for use in the explanation of the switching matrix shown in Fig. 4.

Referring to Figs. 4 and 4A of the drawing, a simplified schematic diagram of one type of switching matrix for use with the encoding system shown in Fig. 1 is illustrated. The function of the switching matrix 8 is to close the diode switches 21*a*–21*e*, shown in Fig. 2, in sequence once during each encoding or scanning cycle. The switching matrix shown in Fig. 4 is essentially an abbreviated binary-octal converter and, as such, a three bit binary code is needed for actuation. The binary code is fed into the switching matrix by positioning the armatures of switches 40, 41 and 42 to either the 0 or 1 terminal in such a fashion that the switching diodes represented by 21*a'*, 21*b'*, 21*c'*, 21*d'* and 21*e'* are sequentially coupled to a battery 44 in series with the resistances 43*a*–43*e*. The binary code necessary to effect the correct sequential scanning operation to sequentially couple the numbering elements 2*a*–2*e* in the mechanical counter 2 are shown by the table in Fig. 4A.

Figure 5:
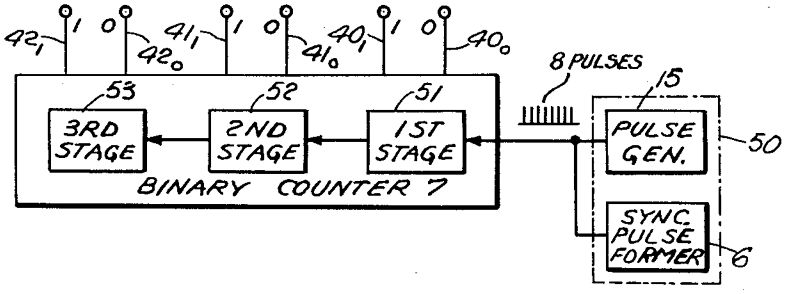
Fig. 5 is a simplified block diagram of the binary counter shown in the system of Fig. 1.
Figure 6:
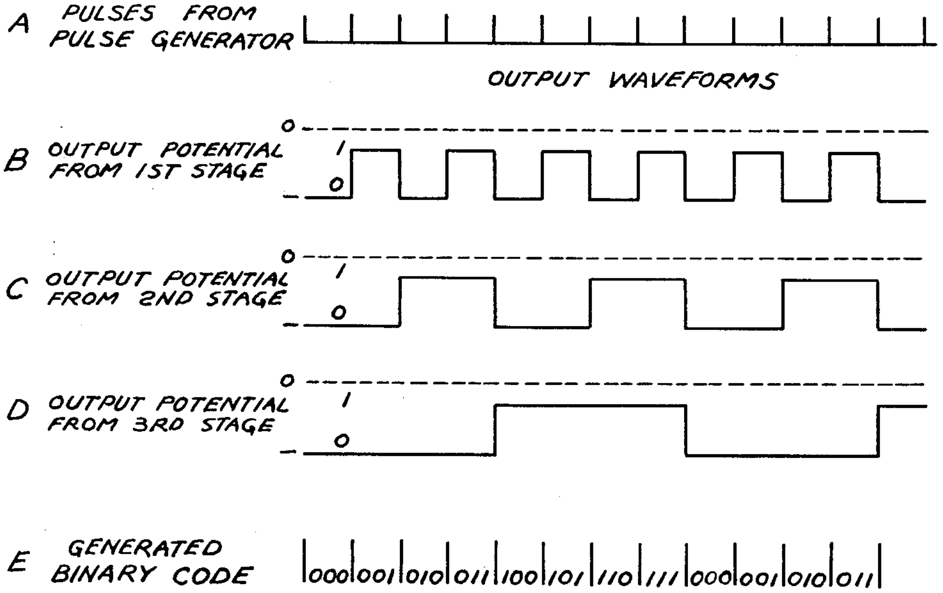
Fig. 6 is a graphic representation of output waveforms and generated binary code helpful in the explanation of the binary counter shown in Fig. 5.

The formation of the binary code necessary to sequentially operate the diode switches 10 is schematically illustrated by the block diagram of the binary counter 7 shown in Fig. 5 and the charts of Fig. 6. It is seen that a pulse generator system 50 composed of pulse generator 15 and the synchronous pulse former 6 provides the eight count pulse train necessary to drive the binary counter 7. The binary counter 7 comprises three flip-flop stages 51, 52 and 53. The first pulse from generator 50 drives the first stage in the binary counter 7 causing the code 001 to be coupled out of the six output leads $40_0$, $40_1$, $41_0$, $41_1$, $42_0$, $42_1$. The six output leads shown in Fig. 5 are equivalent to the positioning of the schematic switches 40—42 shown in Fig. 4. The pulses of the output of generator 50 are uniformly spaced as shown by curve A of Fig. 6 and each pulse input to the first stage drives the next succeeding stage; and curves B, C and D of Fig. 6 are a graphic representation of the culminative potential levels of each of the output leads of the flip-flop stages 51—53 in binary counter 7 and curve E represents the generated binary code, which when compared with Fig. 4A, is seen to be correct to sequentially couple each of the diode switches 10 to the numbering elements of the mechanical counter 2.

Referring again to Fig. 1, it is seen that a sixth output coupled over line 9*a* is utilized as a gating pulse to shut off the pulse generator 15. This gate pulse is applied in such a way that the free running pulse generator 15 ceases operation after the generation of the seven pulses and doesn't commence until the next succeeding scan. Obviously, since a three stage binary counter is necessary to generate the proper switching code, it is necessary that an eight pulse trigger sequence train must be applied to the counter 7 to complete one encoding cycle. The first or starting pulse is applied from the synchronous pulse former 6 responsive to the driving means 5 and the ensuing seven pulses are coupled from the pulse generator 15 and these outputs together form the eight pulse group which is necessary to complete the encoding cycle. A stop pulse or gate signal is obtained from the sixth row of the switching matrix and prevents the operation of the pulse generator 15 until the next pulse signal from pulse former 6 is placed in the binary counter. This start signal automatically removes the stop potential from the pulse generator 15 so that it can supply the seven pulses which when added to the trigger pulse forms the pulse train necessary to actuate the switching system essential to complete the scanning cycles.

Figure 7:
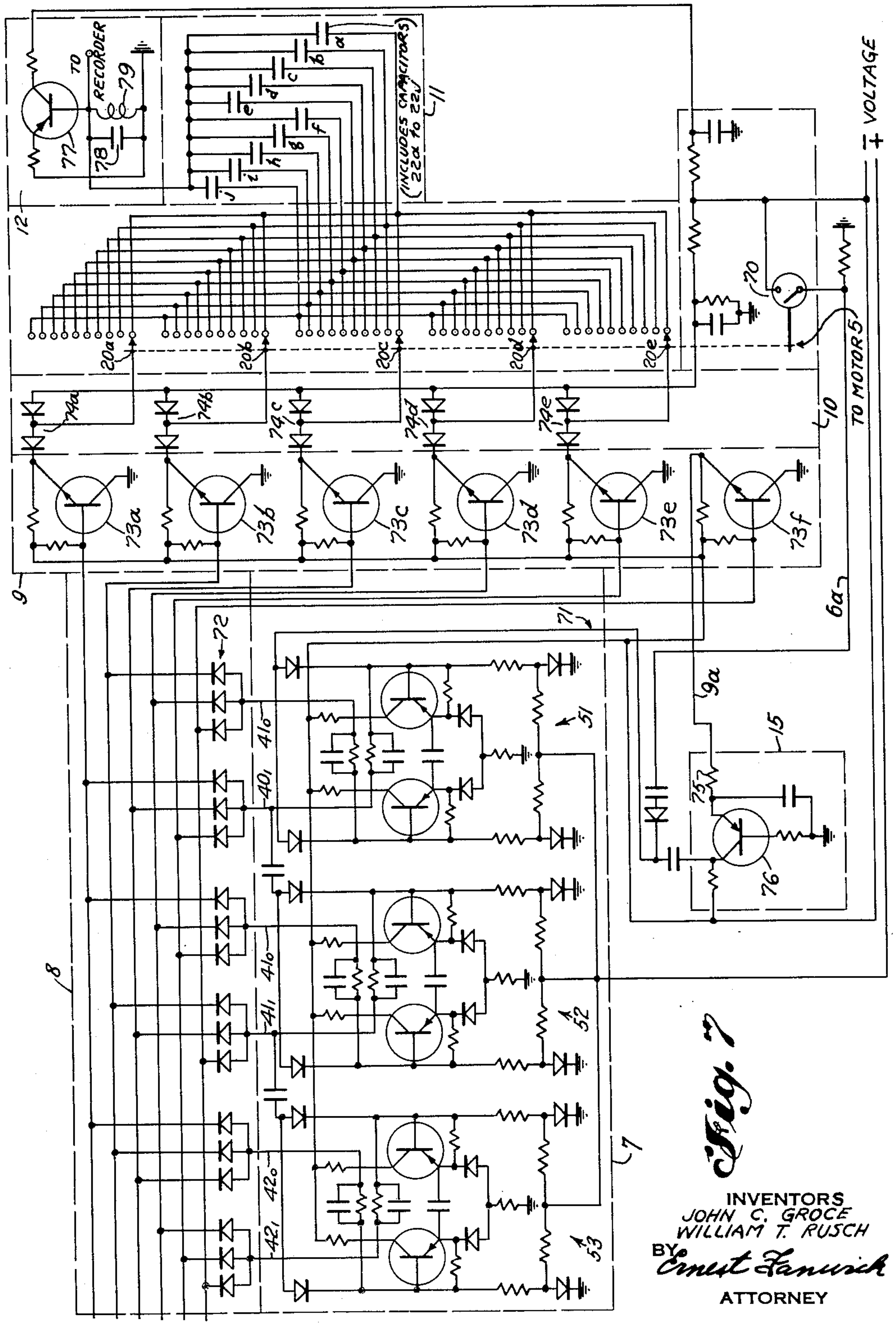
Fig. 7 is a schematic circuit diagram, partly in block form, of the embodiment of the coding system in accordance with the principles of our invention shown in Fig. 1.

Referring to Fig. 7 of the drawing, a schematic circuit diagram partly in block form of the data translating system embodiment shown in Fig. 1 is illustrated. Portions of Fig. 7 are enclosed in dotted blocks and carry the same block reference character as in Fig. 1. The data translating system of our invention can be completely transistorized in order to reduce the size, power, weight and volume of the completed system. The first stage 51 of the binary counter 7 is triggered once each cycle of the motor shaft rotation by a pulse initiated by the closing of the microswitch 70 on the motor armature shaft and the pulse is coupled over line 6*a* and line 71 to trigger binary counter 7. The resulting change of state in each of the counter stages 51—53 permits the generation of the necessary switching codes to actuate the switching matrix 8 as hereinbefore explained. Eighteen diodes 72 are used in the switching matrix 8 to pass the correct voltages from the output of the binary counter 7. Buffer transistors 73*a*–73*f* serve to isolate the various outputs of the switching matrix 8 from each other. The switching matrix 8 is operated so that the base of one of the buffer transistors is at a greater negative potential than the bases of the remaining buffer transistors. In addition, when this greater negative potential is coupled to the gate transistor 73*f*, it causes said transistor to shut off the pulse generator 50. The effect of the switching operation is a scan of the horizontal rows of the switching matrix 8 or, in other words, the application of the greater negative voltage to the base connection of each of the buffer transistors 73*a*–73*f* in sequence. The buffer transistors 73*a*–73*f* are designed to have nearly unity gain in the forward direction so that the greater negative voltage signal is transmitted to the switching diodes 74*a*–74*e*. A greater negative potential on the uppermost buffer transistor 73*a* causes a forward conduction through the associated diode 74*a* and provides a low impedance from the rotor 20*a* to ground potential. At this instant, the lesser negative potential which is coupled through the buffer transistors 73*b*–73*e* to the other switching diodes 74*b*–74*e* provides a high impedance from the remaining decade rotors 20*b*–20*e* to ground potential.

The pulse generator 15 operates along the negative resistance characteristic portion of the emitter curve. Its repetition rate is adjusted, for example, to 20 pulses per second so that the shutoff or gating pulse is applied from the lower buffer transistor 73*f* through a resistance 75 to the emitter of the pulse generator transistor 76 after a train of seven pulses is generated.

The oscillator 12 also utilises the negative resistance characeristic of a transistor 77 to reduce the losses in the inductance-capacitance (LC) tank circuit coupled to the base at a point where the oscillations are sustained. The tank circuit condenser 78 is shunted across the tank circuit inductance 79 to provide a resonant frequency $f_{rest}$. To generate the code frequencies $f_0$–$f_9$, the code capacitors 22*a*–22*j* are coupled in parallel with the tank circuit responsive to the positions of the numbering elements in the counter 2 as they are scanned.

While we have described above the principles of our invention in connection with specific apparatus, it is to be clearly understood that this description is made only by way of example and not as a limitation to the scope of our invention as set forth in the objects thereof and in the accompanying claims.

We claim:

1. A translator for converting a multidigit number into sequential code signals comprising a numbering means including a plurality of cascaded numbering elements each having a plurality of numbering positions any one of which may be assumed by each of said numbering elements to form said multidigit number, a plurality of code signal sources each different in character from the other, means coupling each of said plurality of sources to individual ones of said numbering positions of each of said numbering elements, a utilization means, means coupled to each of said numbering elements responsive to said numbering position assumed by its associated numbering element to select one of said sources, and means to sequentially couple the code signal of each of said selected sources to said utilization means.

2. A translator according to claim 1, wherein said sequential coupling means includes pulse generating means for producing a plurality of sequential pulses, means coupled with and operative on a change of numbering position of said numbering elements to actuate said pulse generating means, a multistage binary pulse counter coupled to the output of said pulse generating means for counting said pulses, a switching matrix coupled to the stages of said binary counter and controlled by the condition thereof, and static switching devices coupled to and controlled by said switching matrix to couple in sequence the code signal of each of said selected sources to said utilization means.

3. A translator according to claim 1, wherein said utilization means includes a record having a recording track, means for recording data on said recording track, driving means for moving said record relative to said recording means, and means for coupling said code signal of each of said selected sources to said recording means for recording on said track.

4. A translator for converting a simultaneous multidigit number record into a sequential code comprising a source of cylic signals, means coupled to said source of cylic signals to code the cycles of said cyclic signals, counting means coupled to said source of cyclic signals including a plurality of cascaded numbering elements each having a plurality of numbering positions any one of which may be assumed by each of said numbering elements to count and record the number of cycles of said cyclic signals to form said multidigit number, a plurality of code signal sources each different in character from the other, means coupling each of said plurality of sources to individual ones of said numbering positions of each of said numbering elements, an output means, means coupled to each of said numbering elements responsive to said numbering position assumed by its associated numbering elements to select one of said code signal sources, and means to sequentially couple the code signal of each of said selected code signal sources to said output means.

5. A translator for converting a multidigit number into a sequential code comprising numbering means including a plurality of cascaded numbering elements each having a plurality of numbering positions any one of which may be assumed by each of said numbering elements to form said multidigit number, means to produce a plurality of signals having different frequencies, means coupling each of said signals to individual ones of said numbering positions of each of said numbering elements, an output means, means coupled to each of said numbering elements responsive to said numbering position assumed by its associated numbering element to select one of said signals, and means to sequentially couple each of said selected signals to said output means.

6. A translator for converting a multidigit number into a sequential code comprising counting means including a plurality of cascaded numbering elements each having a plurality of numbering positions any one of which may be assumed by each of said numbering elements to form said multidigit number, an adjustable frequency generator, a plurality of means for adjusting to different frequencies the output signal of said generator, means coupling each of said frequency adjusting means to individual ones of said numbering positions of each of said numbering elements, an output means, means coupled to each of said numbering elements responsive to said numbering position assumed by its associated numbering element to select one of said frequency adjusting means, and means to sequentially couple the output signal of said generator resulting from each of said selected frequency adjusting means to said output means.

7. A translator for converting a multidigit number into a sequential code comprising counting means including a plurality of cascaded numbering elements each having a plurality of numbering positions any one of which may be assumed by each of said numbering elements to form said multidigit number, an oscillator having a tank circuit including inductive and capacitive impedance elements, a plurality of adjusting means to vary at least one of said impedances of said tank circuit, means coupling each of said adjusting means to individual ones of said numbering positions of each of said numbering elements, means coupled to each of said numbering elements responsive to said numbering position assumed by its associated numbering element to select one of said adjusting means, and means to sequentially couple each of said selected adjusting means to said tank circuit to vary the frequency of the output signal therefrom.

8. A translator for converting a multidigit decimal number into a sequential code comprising a digital counter including a plurality of cascaded numbering elements each having a plurality of numbering positions any one of which may be assumed by each of said numbering elements to form said multidigit number, a plurality of code signal sources each different in character from the other, means coupling each of said plurality of sources to individual ones of said numbering positions of each of said numbering elements, output means, means coupled to each of said numbering elements responsive to said numbering position assumed by its associated numbering element to select one of said sources, and means to sequentially couple the code signal of each of said selected sources to said output means.

9. A translator for converting a decimal count into a sequential code comprising a digital counter including a plurality of cascaded numbering elements each having a plurality of numbering positions any one of which may be assumed by each of said numbering elements to form said multidigit number, a source of cyclic signals, means responsive to said source of cyclic signals to actuate the lowest denomination numbering element to render said multidigit number equal to the number of counter cycles of said source of cyclic signals, a plurality of code signal sources each different in character from the other, means coupling each of said plurality of code signal sources to individual ones of said numbering positions of each of said numbering elements, an output means, means coupled to each of said numbering elements responsive to said numbering position assumed by its associated numbering element to select one of said plurality of code signal sources, and means to sequentially couple the code signal of each of said selected signal sources to said output means.

10. A device to record elapsed time as a sequential code comprising a source of regularly repetitive signals having a given period, digital counter means including a plurality of cascaded numbering elements each having a plurality of numbering positions any one of which may be assumed by each of said numbering elements so that the numbering position assumed by each of said numbering elements records the number of counted periods of said repetitive signals, means responsive to said repetitive signals to actuate the lowest denomination numbering elements, a plurality of code signal sources each different in character from the other, means coupling each of said plurality of sources to individual ones of said numbering positions of each of said numbering elements, an output means, means coupled to each of said numbering elements responsive to said numbering positions assumed by its associated numbering element to select one of said sources, and means to sequentially couple the code signal of each of said selected code signal sources to said output means.

11. A device to record elapsed time as a sequential code comprising a source of regularly repetitive signals hving a given period, a digital counter means including a plurality of cascaded numbering elements each having a plurality of numbering positions any one of which may be assumed by each of said numbering elements so that the numbering position assumed by said numbering elements records the number of counted periods of said repetitive signals, means coupled to said source of repetitive signals to actuate the lowest denomination numbering element, means to produce a trigger signal responsive to each period of said repetitive signals, means responsive to said trigger signal to produce a plurality of switching signals, a plurality of code signal sources each different in character from the other, means coupling each of said plurality of sources to individual ones of said numbering positions of each of said numbering elements, output means, means coupled to each of said numbering elements responsive to said numbering position assumed by its associated numbering element to select one of said code signal sources, and means responsive to said switching signals to sequentially couple the code signal of each of said selected sources to said output means.

References Cited in the file of this patent

UNITED STATES PATENTS

| | | |
|---|---|---|
| 2,369,662 | Deloraine et al. | Feb. 20, 1945 |
| 2,457,149 | Herbst | Dec. 28, 1948 |
| 2,483,445 | Talley | Oct. 4, 1949 |
| 2,502,837 | Entz et al. | Apr. 4, 1950 |
| 2,517,316 | Holmes | Aug. 1, 1950 |
| 2,559,622 | Hildyard | July 10, 1951 |
| 2,570,716 | Rochester | Oct. 9, 1951 |
| 2,576,099 | Bray et al. | Nov. 27, 1951 |
| 2,643,172 | Reiss | June 23, 1953 |
| 2,656,524 | Gridley et al. | Oct. 20, 1953 |
| 2,701,279 | Lovell et al. | Feb. 1, 1955 |
| 2,793,807 | Yaeger | May 28, 1957 |
| 2,816,163 | Robin | Dec. 10, 1957 |
| 2,826,252 | Dickstein | Mar. 11, 1958 |